No. 668,385. Patented Feb. 19, 1901.
F. W. MORGAN.
ELASTIC TIRED VEHICLE WHEEL.
(Application filed Aug. 15, 1899.)
(No Model.) 2 Sheets—Sheet 1.
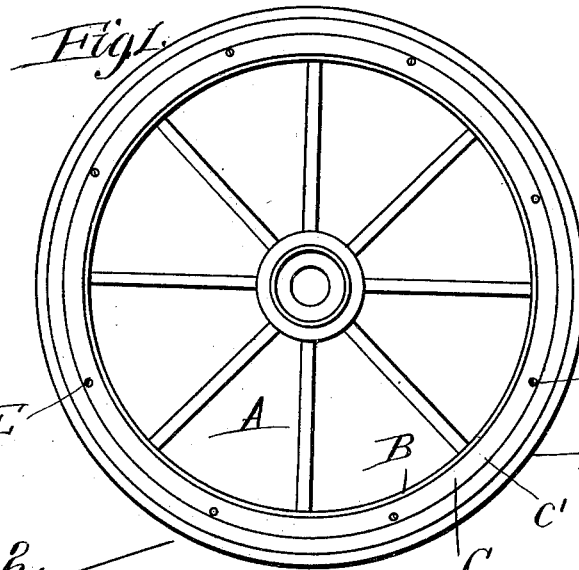
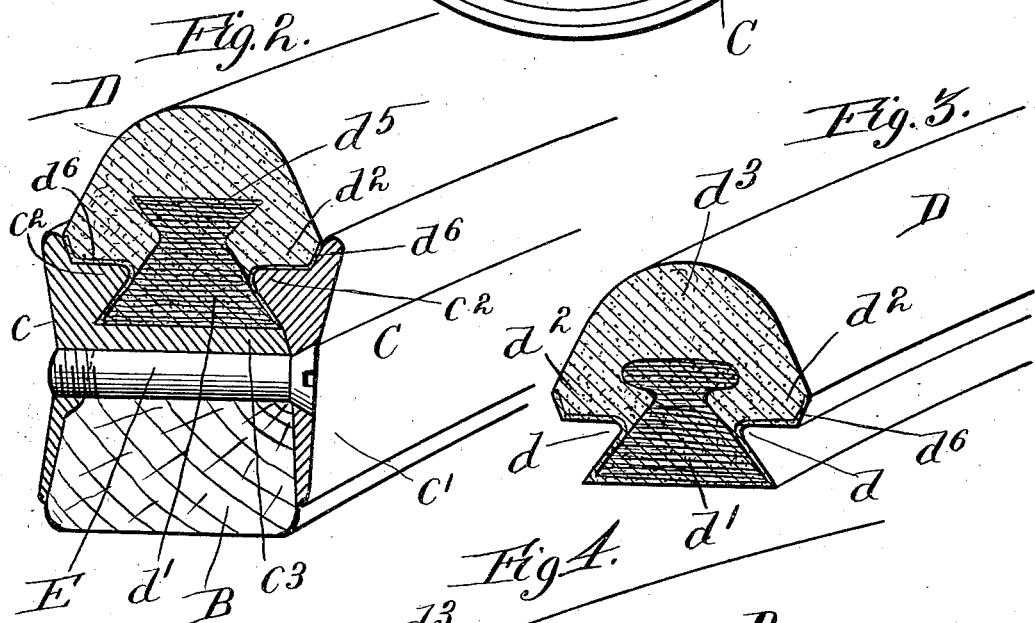
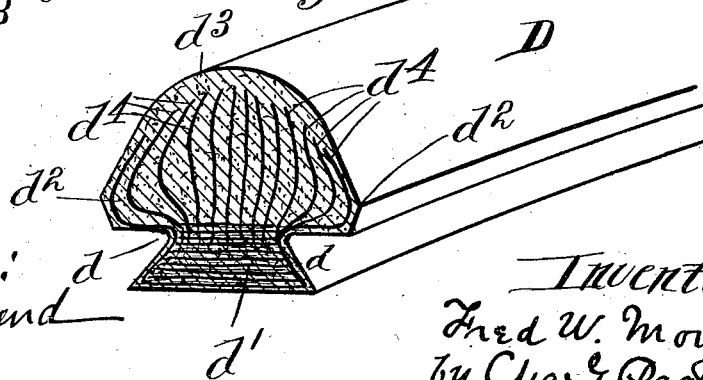
Witnesses:
Inventor:
Fred W. Morgan.
by Chas L. Page
Atty

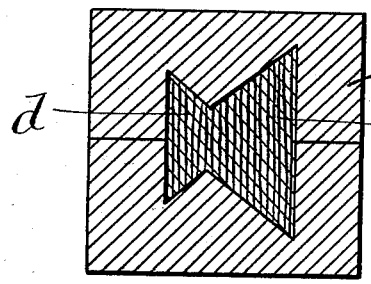
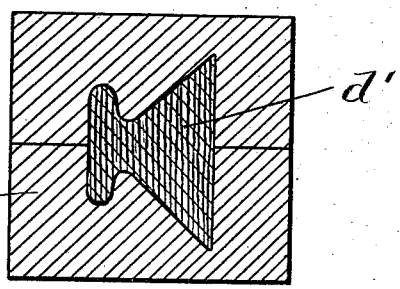
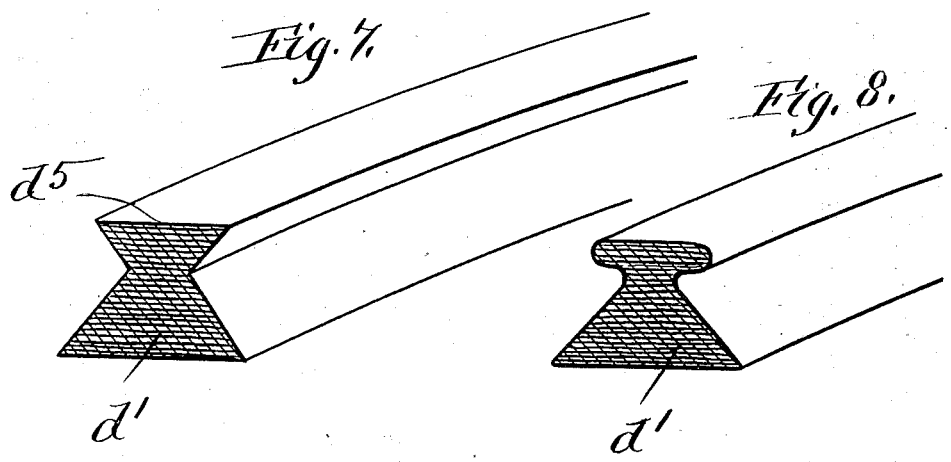

UNITED STATES PATENT OFFICE.

FRED W. MORGAN, OF CHICAGO, ILLINOIS.

ELASTIC-TIRED VEHICLE-WHEEL.

SPECIFICATION forming part of Letters Patent No. 668,385, dated February 19, 1901.

Application filed August 15, 1899. Serial No. 727,282. (No model.)

*To all whom it may concern:*

Be it known that I, FRED W. MORGAN, a citizen of the United States, residing at Chicago, county of Cook, State of Illinois, have invented a certain new and useful Improvement in Elastic-Tired Vehicle-Wheels, of which the following is a specification.

In carrying out my invention I construct the elastic tire from fabric and rubber or rubber composition and form the same with annular side grooves, which, in effect, provide the tire with an inwardly-projecting base portion and also with overhanging lateral or side portions. These annular grooves are preferably of such character that the base portion is substantially dovetail in cross-section. The tread portion and also the overhanging lateral or side portions of the tire are composed of rubber or rubber composition. The flaring or dovetail-shaped base portion of the tire is, however, preferably composed of fabric—such, for instance, as friction-duck—and is secured to the rubber tread by means of a fabric extension which extends into and is firmly embedded within the rubber. This fabric extension of the solid fabric base portion of the tire may, if so desired, take the form of radiating leaves or thicknesses of the cloth or duck, and in such case the rubber and fabric can be placed together in a suitable mold and so molded into the desired form; but a preferred and more economical method consists in first molding the fabric base portion in a separate mold, and then placing this solid fabric tire-base, together with the rubber, in a second mold, and thus molding and vulcanizing the two firmly together. With this latter method the tire-base can be molded with a solid-fabric extension and the rubber tread can then be molded upon and about such extension. This fabric extension, which serves to hold the fabric base and rubber tread together, and which preferably extends for some distance into the body of the latter, can be flaring or dovetail in cross-section, and in which case the rubber tread and fabric base may be said to be secured together with a dovetail joint. The felly-rim is provided with annular ribs or shoulders, which engage in the said grooves in the sides of the tire and which support the overhanging lateral or side portions of the tire. These ribs can be either formed integral with or made separate from the said felly-rim; but in either case the fabric base and rim will, like the base and tread, be secured together with a joint which is substantially dovetail in character, and for this reason there will be no danger of the tire being torn from the wheel. The tire may be made in the form of a straight length or, if so desired, it can be made in the form of an annular and endless ring. Any suitable form of felly-rim may be employed; but a preferred form consists of a rim composed of a couple of annular cheek-plates, which are held and drawn together by bolts for the purpose of compressing the fabric tire-base. This lateral compression of the fabric base portion of the tire is highly effective in preventing the latter from creeping or shifting circumferentially upon the rim. The fabric extension, which holds the rubber tread and fabric base together, effectually prevents the two from being torn apart, and as a further advantage the fabric base thus formed and connected with the rubber tread permits me to entirely dispense with the use of wires and metal bands for securing the tire upon the wheel. Also with this arrangement and construction the tire may consist of short lengths and may be made to serve as effectually in this form as in any other. Various other features and advantages of my invention will hereinafter more fully appear.

Referring to the accompanying drawings, Figure 1 is a side elevation of an elastic-tired vehicle-wheel embodying the principles of my invention. Fig. 2 is a view, on an enlarged scale, illustrating in cross-section a portion of the felly, felly-rim, and elastic tire shown in Fig. 1. Figs. 3 and 4 illustrate different forms of the tire. Figs. 5 and 6 are views illustrating the manner in which the fabric base portions of the tires shown in Figs. 2 and 3 may be molded by means of a two-part mold. Figs. 7 and 8 illustrate in cross-section and also partly in perspective the two forms of fabric tire-base or base portion shown in Figs. 2, 3, 5, and 6.

The elastic-tired vehicle-wheel thus illustrated comprises a suitable wheel A, provided with a felly B and felly-rim C, which is secured to the felly and which is provided peripherally with a channel for the elastic tire D. The said tire is preferably composed of fabric—such, for instance, as friction-duck and rubber or rubber composition—and is formed with annular side grooves $d\ d$, which, in effect, provide the tire with a flaring base portion $d'$ and also with overhanging lateral or side portions $d^2$. These overhanging lateral or side portions of the tire, together with the tread portion $d^3$, constitute the body or main portion of the tire and are preferably composed of rubber or rubber composition. Preferably the base portion $d'$ of the tire is composed of fabric—that is to say, of layers of cloth or other suitable fibrous material—and is secured to the body portion of the tire by means of a fabric extension which extends into and is firmly embedded within the rubber. This fabric extension of the flaring fabric tire-base may vary as to form and character—as, for instance, it may take the form of radiating leaves or thicknesses $d^4$, as shown in Fig. 4, and in which case it will be seen that these leaves extend up into the rubber of the tire and are firmly embedded therein. Another way, however, and one which I find to be highly economical and generally satisfactory, consists in providing the solid fabric base portion $d'$ of the tire with a solid fabric portion $d^5$, which it will be observed is characterized by a flare or spreading out in an opposite direction to that of the said base portion $d'$. (See Fig. 2.) This flaring rib or tongue of fabric, which projects for some distance into the rubber body portion of the tire and which is firmly embedded therein, serves to prevent the tire—that is to say, the rubber portion of the tire—from being torn or separated from its fabric base portion, for it will be seen that the rubber tread and the fabric base are practically secured together with a dovetail joint and that the two when thus connected and vulcanized together are practically one.

Still another way of effectively connecting the fabric base with the rubber tread is illustrated in Fig. 3, wherein it will be seen that the fabric tongue or extension of the fabric base $d'$ is similar to the one shown in Fig. 2, and that it is, notwitstanding a slight difference in form, also substantially dovetail in character.

If so desired, the overhanging lateral or side portions $d^2$ of the tire can be reinforced or strengthened by means of one or more layers or thicknesses of fabric $d^6$, as shown in the drawings.

The felly-rim may be of any suitable form, but preferably consists of a couple of oppositely-arranged and annular cheek-plates $c\ c'$, which are adapted to fit against the sides of the felly B and which are held and drawn together by means of bolts or screws E. Both cheek-plates are provided with annular ribs or shoulders $c^2$, which engage the annular grooves $d$ in the sides of the tire and which support the overhanging lateral or side portions $d^2$ of the said tire. The base or seating portion of the felly-rim is provided by a web $c^3$, which is preferably formed integral with cheek-plate $c$, it being observed also at this juncture that the bolts E are inserted through the cheek-plates and felly at points immediately inside of the line of juncture between the latter and the said web. By such arrangement the wheel is provided with a longitudinally-divided rim forming clamping members, which when assembled provide a longitudinal laterally-flaring channel for the similarly-shaped base of the tire. The form of divided rim shown and preferably employed has the inner circumferential ribs $c^2$ of its clamping members each adapted to provide an annular offset or grooved seat for the portions of the tire which overhang the base thereof, thereby further steadying and holding the tire against lateral yield and also protecting its edges against wear. It will also be seen that the fabric incorporated in the base and upper or body portion of the tire resists longitudinal stretch of such portions without, however, impairing the elasticity of the tread or body portion of such tire. The tire, at least its base portion, can be made somewhat wider than the channel provided by the outer portions of the cheek-plates, and in this way such base portion of the tire will be subjected to lateral compression by the drawing together of the two portions of the rim. Such lateral compression of the solid fabric base portion of the tire will effectually prevent the tire from creeping or shifting circumferentially upon the rim, and also this compression, together with the dovetail character of the joint with which the tire and separable felly-rim are secured together, will prevent the tire from shifting laterally or being torn from the wheel.

The tire can be made either in the form of a straight length or in the form of an annular and endless ring. As a still further advantage of this construction it will be seen that short lengths of tire can be mounted and secured within the separable felly-rim, and that by longitudinally compressing such short lengths of tire the same can be made to serve as effectually as a continuous tire—that is to say, fully as effectually as a tire made in one piece.

By thus employing a solid fabric base portion which is connected with and secured to the rubber tread of the tire by means of a rib or tongue, which is substantially dovetail in character, or by means of radiating leaves or thicknesses of fabric, as shown in Fig. 4, I am enabled to dispense with the use of wires and metal bands and all similar devices for securing the tire within the channel of the felly-rim, for it will be seen that the dovetail character of the joint with which the tire and rim are secured together prevents the two from being torn apart and renders it unnecessary to make further provision in the way of wires, &c., for maintaining the tire upon the wheel.

With the forms of tire shown in Figs. 2 and 3 the fabric base portion or tire-base can first be molded in a separate mold, and a second mold can then be employed for molding and vulcanizing the rubber body portion of the tire about the tongue or fabric extension $d^5$.

In Figs. 5 and 6 I have illustrated in cross-section a two-part mold F for molding these fabric tire-bases, it being understood that these molds may be either straight or annular in form, according to the form of tire desired. If it is desired to make the tire in the form of a straight length, the fabric will be molded in the form of a straight strip having lateral grooves; but if it is desired that the tire be annular in form the fabric will then be molded in the form of an annular and endless ring having lateral grooves adapted to give it the aforesaid dovetail character. It will be understood, however, that the form of the tire-base and also that of the fabric extension, by which the same is connected with the rubber tread, may be varied to some extent without departing from the spirit of my invention, and also that various forms of felly-rim may be employed, according to circumstances and the particular purpose for which the wheel is to be used.

What I claim as my invention is—

1. The combination of a wheel-rim divided longitudinally to form tire-clamping members which when assembled provide a laterally-flaring channel with annular offsets at opposite sides thereof adapted as tire-seats; and a substantially solid tire of rubber or rubber composition and fabric molded with a laterally-flaring base which is confined within the channel and clamped by the clamping members of the rim, and with overhanging portions seated in the annular offsets at opposite sides of the channel, the fabric being incorporated both within the base and tread portions of the tire to resist longitudinal stretch on the part of the base and upper body portion of the tire, without impairing the elasticity of such body portion.

2. A tire provided with lateral grooves, and a felly-rim provided with shoulders for supporting the overhanging lateral or side portions of the tire, which are formed by the said grooves; the said tire consisting of a rubber or rubber-composition tread portion, and a fabric base portion which is secured to the said tread portion by means of fabric extending up into the body of such tread portion.

3. The combination of a wheel, a felly-rim, a fabric base portion secured to the rim with a dovetail or substantially dovetail joint, and a rubber tread portion secured to the said base portion with a substantially dovetail joint.

4. In combination with a suitable rim, a tire comprising a fabric base portion which is molded with lateral grooves, and a rubber tread portion which is molded upon and about the outer portion of said fabric base portion.

5. In combination with a suitable rim, a tire having a tread and overhanging lateral or side portion composed of rubber or rubber composition, and having also a flaring base portion which is composed of superimposed layers of fabric and which is secured to the rubber tread by means of fabric extending up into the body of such tread portion.

6. The combination of a wheel provided with a separable felly-rim, an elastic and substantially solid tire seated within said rim and comprising a tread portion of rubber or rubber composition and a flaring base portion of fabric, said base portion being molded with a flaring portion which extends into the body of the said rubber tread portion, and means for securing the tire, rim and wheel together.

FRED W. MORGAN.

Witnesses:
W. F. SYLVESTER,
FRANK C. MORGAN.